(12) United States Patent
Yang et al.

(10) Patent No.: US 8,259,458 B2
(45) Date of Patent: Sep. 4, 2012

(54) BATTERY COVER ASSEMBLY FOR PORTABLE ELECTRONIC DEVICE

(75) Inventors: Mu-Wen Yang, Taipei (TW);
Chih-Chiang Chang, Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 367 days.

(21) Appl. No.: 12/649,565

(22) Filed: Dec. 30, 2009

(65) Prior Publication Data

US 2010/0277854 A1 Nov. 4, 2010

(30) Foreign Application Priority Data

Apr. 30, 2009 (CN) .......................... 2009 1 0302058

(51) Int. Cl.
*H05K 5/03* (2006.01)

(52) U.S. Cl. ........ 361/755; 361/801; 361/802; 361/803; 361/726; 361/732; 361/747; 361/759; 361/679.01; 361/679.57; 361/679.58; 455/550.1; 455/575.1; 455/575.2; 455/575.3; 455/575.4; 455/575.8; 455/90.3; 429/96; 429/97; 429/100

(58) Field of Classification Search .......... 361/801–803, 361/726, 732, 747, 759, 679.01, 679.57, 361/679.58, 755; 455/550.1, 575.1–575.4, 455/575.8, 90.3; 429/96, 97, 100

See application file for complete search history.

(56) References Cited

U.S. PATENT DOCUMENTS

| | | | | |
|---|---|---|---|---|
| 5,764,477 A | * | 6/1998 | Ohgami et al. | 361/679.55 |
| 6,006,074 A | * | 12/1999 | De Larminat et al. | 455/575.1 |
| 6,226,189 B1 | * | 5/2001 | Haffenden et al. | 361/814 |
| 6,521,370 B1 | * | 2/2003 | Takeshita et al. | 429/96 |
| 7,383,029 B2 | * | 6/2008 | Sasaki et al. | 455/128 |
| 7,445,510 B2 | * | 11/2008 | Feng et al. | 439/630 |
| 7,555,312 B2 | * | 6/2009 | Kim et al. | 455/556.1 |
| 7,876,575 B2 | * | 1/2011 | Hosokawa | 361/797 |
| 2002/0034683 A1 | * | 3/2002 | Takeshita et al. | 429/123 |
| 2003/0217761 A1 | * | 11/2003 | Maelstaf | 132/294 |
| 2004/0224220 A1 | * | 11/2004 | Wang et al. | 429/96 |
| 2004/0224221 A1 | * | 11/2004 | Chen et al. | 429/96 |
| 2004/0229114 A1 | * | 11/2004 | Liang et al. | 429/100 |
| 2006/0148425 A1 | * | 7/2006 | Carlson | 455/90.3 |
| 2006/0192525 A1 | * | 8/2006 | Qin et al. | 320/107 |
| 2006/0225249 A1 | * | 10/2006 | Cho | 16/334 |
| 2007/0122693 A1 | * | 5/2007 | Qin et al. | 429/97 |
| 2009/0262506 A1 | * | 10/2009 | Shi et al. | 361/727 |

\* cited by examiner

*Primary Examiner* — Hung S Bui
*Assistant Examiner* — James Wu
(74) *Attorney, Agent, or Firm* — Altis Law Group, Inc.

(57) ABSTRACT

A battery cover assembly for a portable electronic device includes a housing, a battery cover, and a pivot member. The housing forms a first latch portion and a second latch portion, the first latch portion and the second latch portion being arranged at a circle. The battery cover forms a first engaging portion and a second engaging portion engaging with the first latch portion and a second latch portion to allow the battery cover to releasably latch to the housing. The pivot member rotatably connects the battery cover to the housing.

15 Claims, 7 Drawing Sheets

BATTERY COVER ASSEMBLY FOR PORTABLE ELECTRONIC DEVICE

CROSS-REFERENCE TO RELATED APPLICATIONS

This application is related to two co-pending U.S. patent applications Ser. Nos. 12/649,570 and 12/649,561, both entitled "BATTERY COVER ASSEMBLY FOR PORTABLE ELECTRONIC DEVICE", by MU-WEN YANG et al. Such applications have the same assignee as the instant application and have been concurrently filed herewith. The disclosures of the above identified applications are incorporated herein by reference.

BACKGROUND

1. Technical Field

The present disclosure generally relates to battery cover assemblies and, particularly, to a battery cover assembly for use in a portable electronic device.

2. Description of Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, for example, the batteries are damaged and/or dead (i.e. no longer rechargeable).

Although battery cover assemblies may be simple, the engagement between the battery cover and the housing of the mobile phone can be too firm to be easily manually detached from each other.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION

Figure 1:
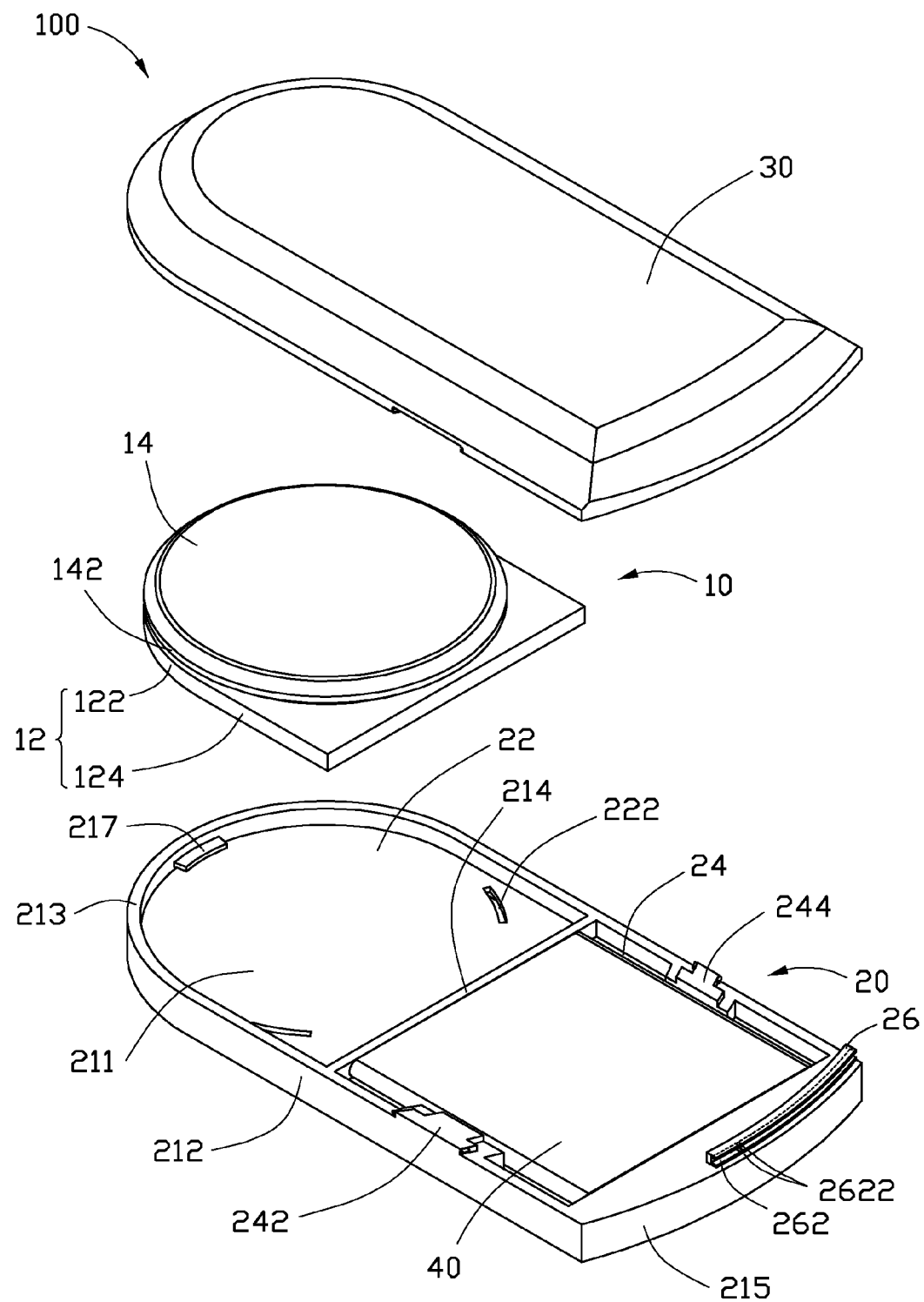
FIG. 1 is an exploded, isometric view of a portable electronic device employing a battery cover assembly in accordance with an exemplary embodiment.
Figure 2:
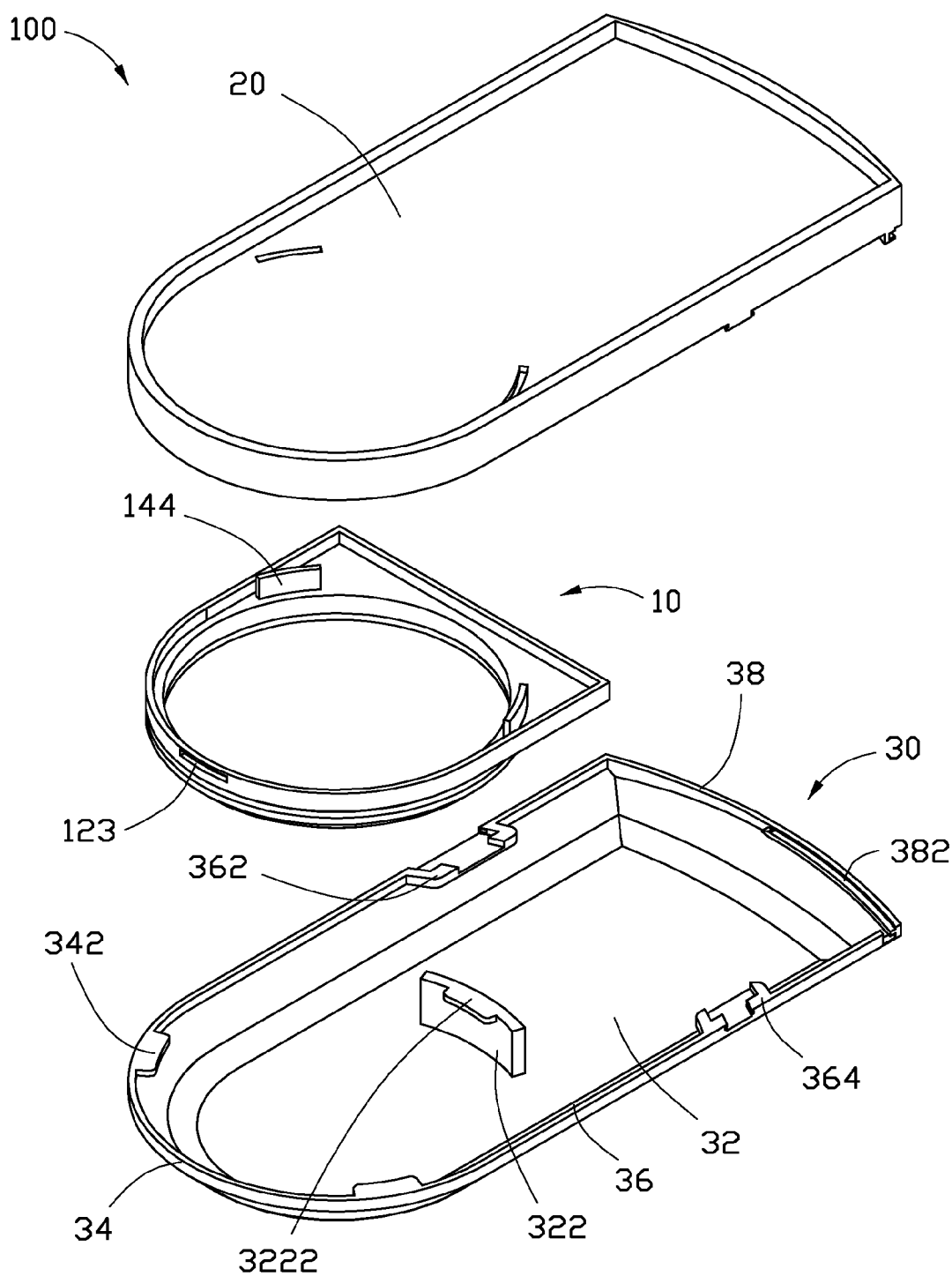
FIG. 2 is similar to FIG. 1, but viewed from another aspect.

FIGS. 1 and 2 show a portable electronic device 100, such as a mobile phone, employing a battery cover assembly. The mobile phone is an exemplary application, for the purposes of describing details of an exemplary embodiment of a battery cover assembly. The battery cover assembly incorporates a pivot member 10, a housing 20, and a battery cover 30. The pivot member 10 rotatably connects the battery cover 30 to the housing 20.

The pivot member 10 includes a base plate 12 and a circular disk 14 mounted on the base plate 12. The base plate 12 includes a semi-circular portion 122 tangentially connected to a rectangular portion 124. The circular disk 14 is coaxial with the semi-circular portion 122. The semi-circular portion 122 defines a cutout 123. A ring groove 142 is defined in an outermost circumferential edge of the circular disk 14 toward the base plate 12. The base plate 12 has two arcuate ribs 144 defined adjacent to and coaxial with a circumference of the circular disk 14.

The housing 20 includes a base body 211, two sidewalls 212, a semi-circular wall 213, and an end wall 215. A beam 214 divides the base body 211 into a groove 22 for receiving the base plate 12 and a cavity 24 for receiving a battery 40. The base body 211 in the groove 22 defines two latching slots 222 for receiving the ribs 144 of the pivot member 10. The semi-circular wall 213 forms a latching plate 217 engagable in the cutout 123. The end wall 215 forms an arcuate bar 26. The bar 26 defines a guiding groove 262 and forms a projection 2622 on each of two parallel side walls defining the guiding groove 262.

Figure 3:
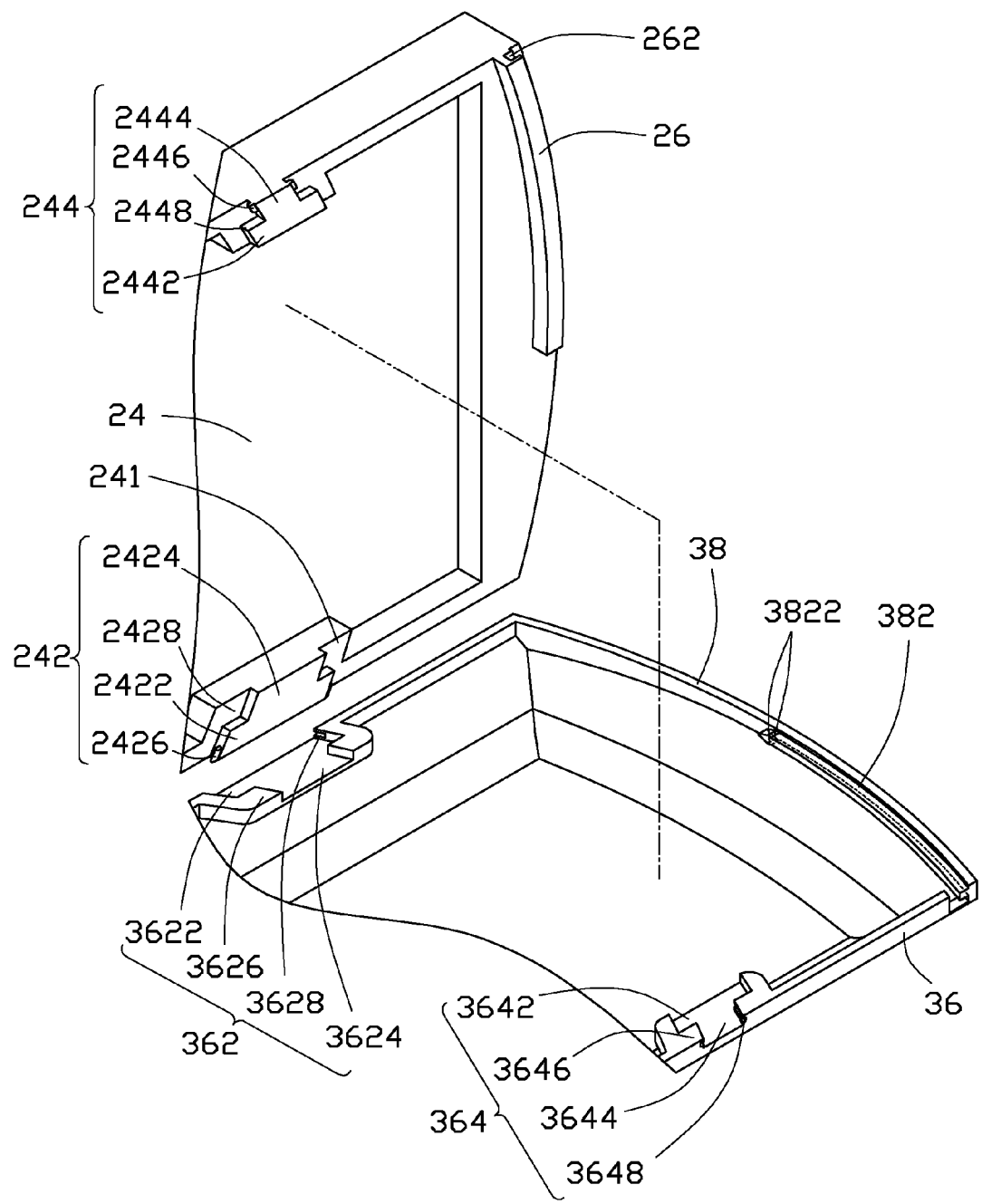
FIG. 3 is a partially enlarged view of the housing and the battery cover assembly shown in FIG. 1.

Referring to FIG. 3, each sidewall 212 forms a support stage 241 extending into the cavity 24. The two support stages 241 respectively form a first latch portion 242 and a second latch portion 244. The first latch portion 242 and the second latch portion 244 are arranged in a circle coaxial to the circular disk 14.

The first latch portion 242 includes a first block 2422 and a second block 2424 integrally formed together, thereby forming a substantially T-shaped portion. A stopper space 2428 is defined at a connection between the first block 2422 and the second block 2424. The first block 2422 respectively extends two first protrusions 2426 at two sides thereof. The second latch portion 244 is similar to the first latch portion 242, and includes a first block 2442 and a second block 2444 integrally formed together, thereby forming a substantially T-shaped portion. A stopper space 2448 is defined at a connection between the first block 2442 and the second block 2444. The second block 2444 respectively extends two second protrusions 2446 at two sides thereof.

The battery cover 30 includes a back wall 32, a semi-circular edge 34, an end edge 38, and two sides edges 36. An arcuate block 322 perpendicularly protrudes from the back wall 32. A tab 3222 perpendicularly extends from the arcuate block 322. The semi-circular edge 34 extends another two spaced tabs 342. The tabs 3222, 342 respectively engage in the ring groove 142 of the circular disk 14. The end edge 38 forms an extending portion 382 for engaging in the guiding groove 262. The extending portion 382 forms a protuberance 3822 at one end of each side thereof that respectively engages with the projections 2622. The two side edges 36 respectively form a first engaging portion 362 and a second engaging portion 364.

The first engaging portion 362 and the second engaging portion 364 are arranged in a circle coaxial to the circular disk 14. The first engaging portion 362 and the second engaging portion 364 respectively correspond to the first latch portion 242 and the second latch portion 244. The first engaging portion 362 defines a first receiving space 3622 communicating with a second receiving space 3624. The first receiving space 3622 and the second receiving space 3624 combine substantially to form a T-shaped space, and a stopper block 3626 is formed therebetween. A first slot 3628 is defined in a sidewall of the first receiving space 3622. The second engaging portion 364 is similar to the first engaging portion 362. The second engaging portion 364 defines a first receiving space 3642 communicating with a second receiving space 3644. The first receiving space 3642 and the second receiving space 3644 combine substantially a T-shaped space, and a stopper block 3646 is formed therebetween. A second slot 3648 is defined in a sidewall of the second receiving space 3644.

Figure 4:
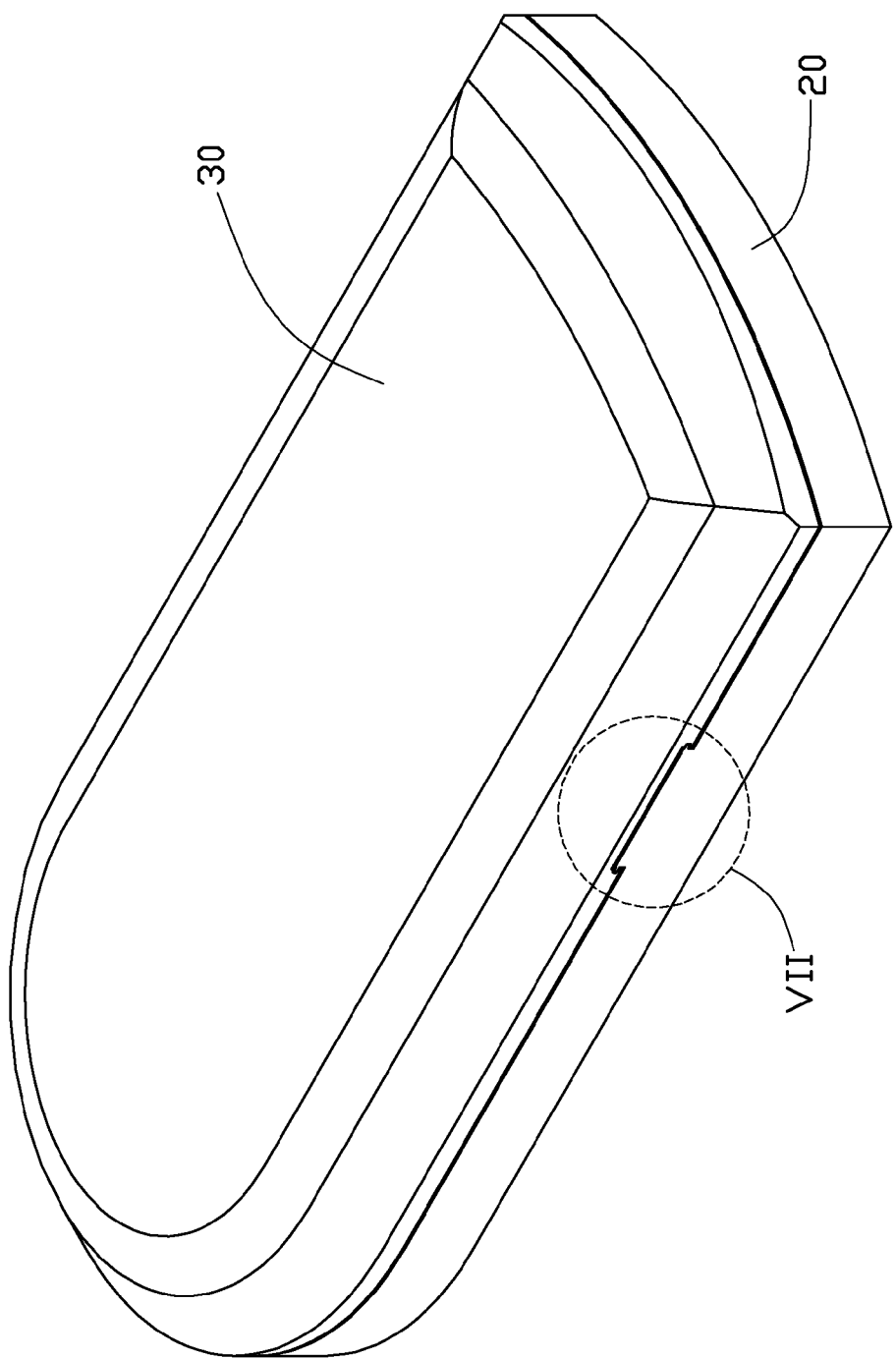
FIG. 4 is an assembled view of FIG. 1.
Figure 5:
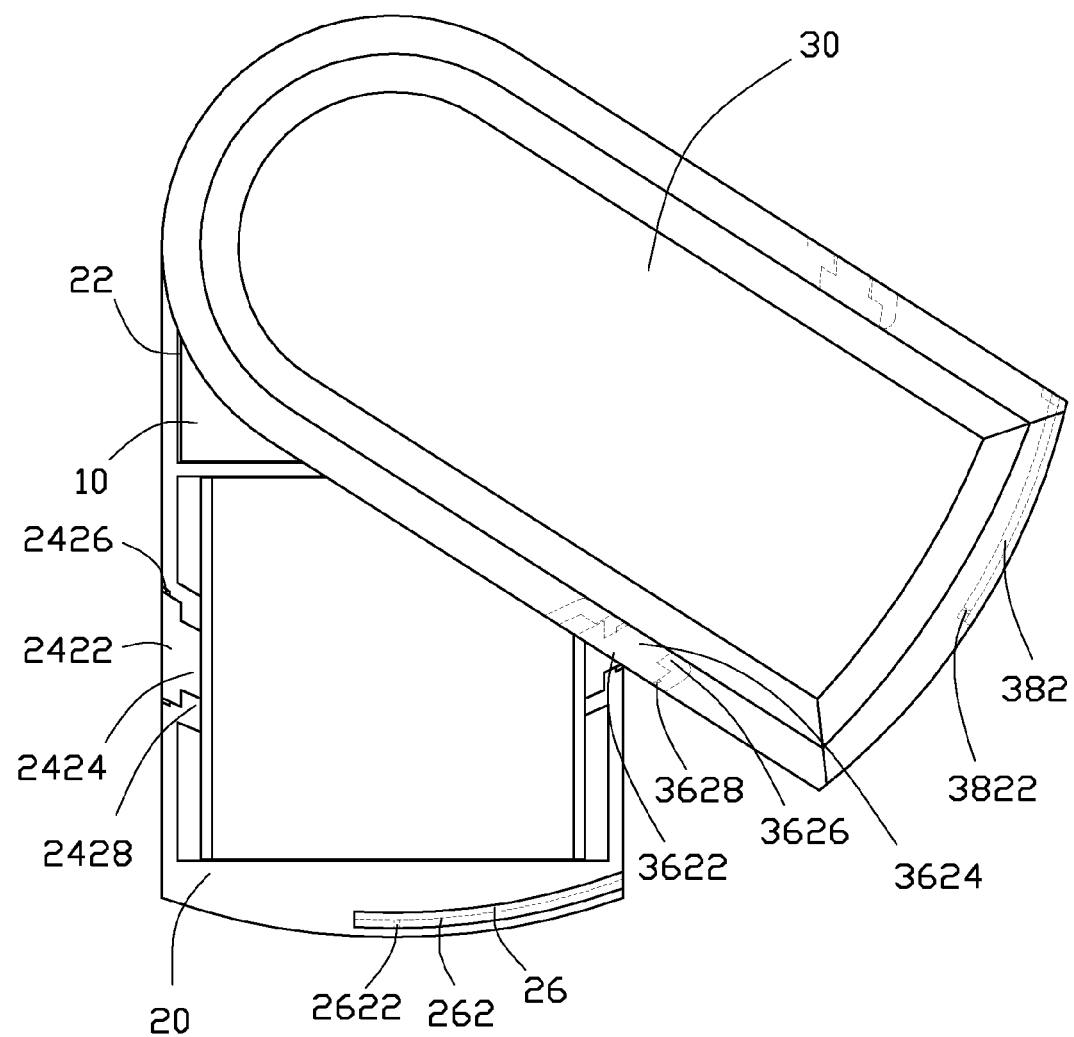
FIG. 5 is similar to FIG. 4 but viewed from another aspect and with a battery cover open.

During assembly of the battery cover assembly, referring to FIGS. 4 and 5, firstly, the base plate 12 is received in the groove 22, and the ribs 144 are latched in the latching slots 222. The latching plate 213 is latched in the cutout 123 to cause the pivot member 10 to be mounted to the housing 20. Then, the tabs 342, 3222 of the battery cover 30 are received in the ring groove 142 of the pivot member 10. Thus, the battery cover 30 is rotatably connected to the housing 20.

Figure 6:
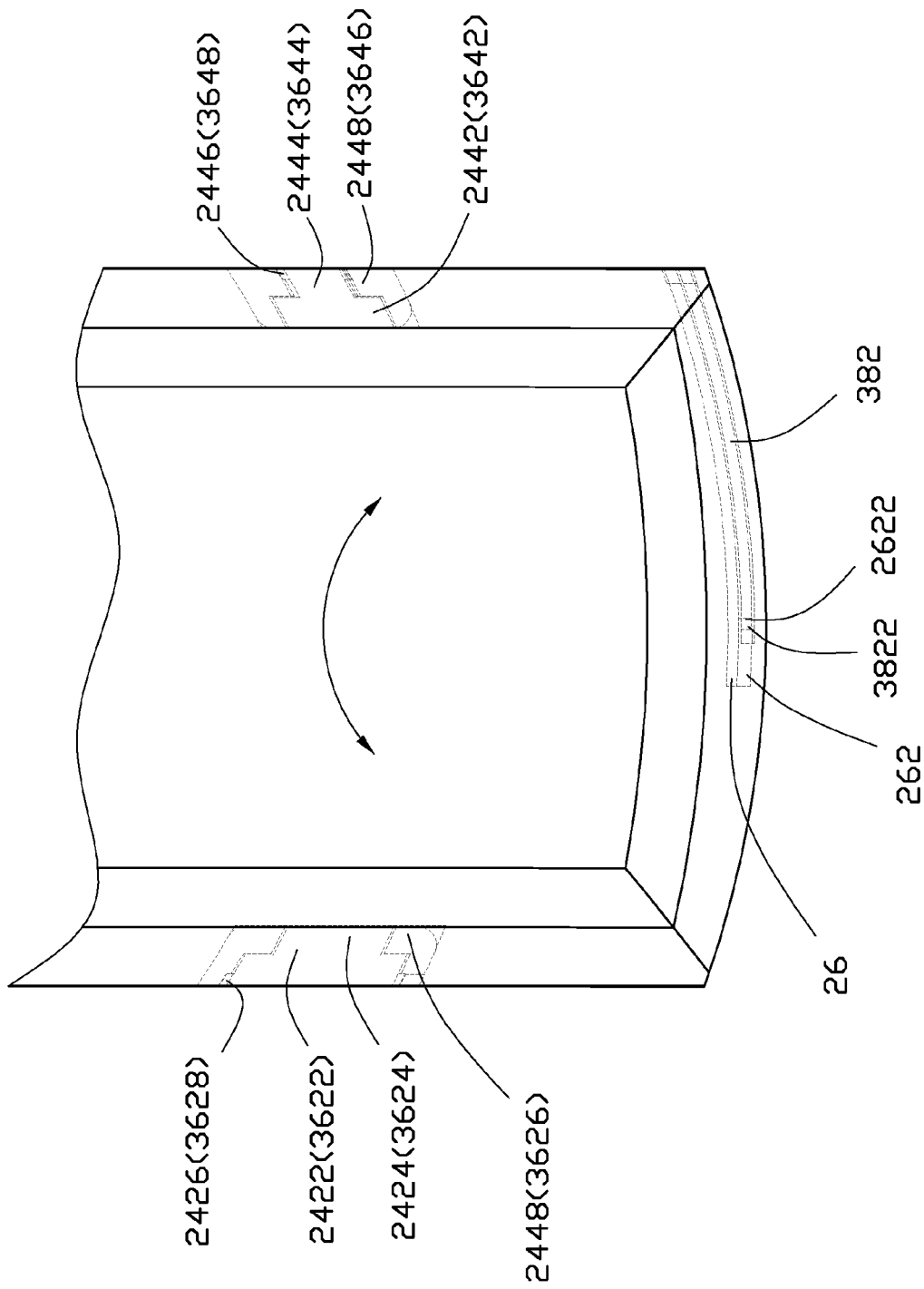
FIG. 6 is a partial enlarged view of the portable electronic device of FIG. 5 showing the battery cover closed.
Figure 7:
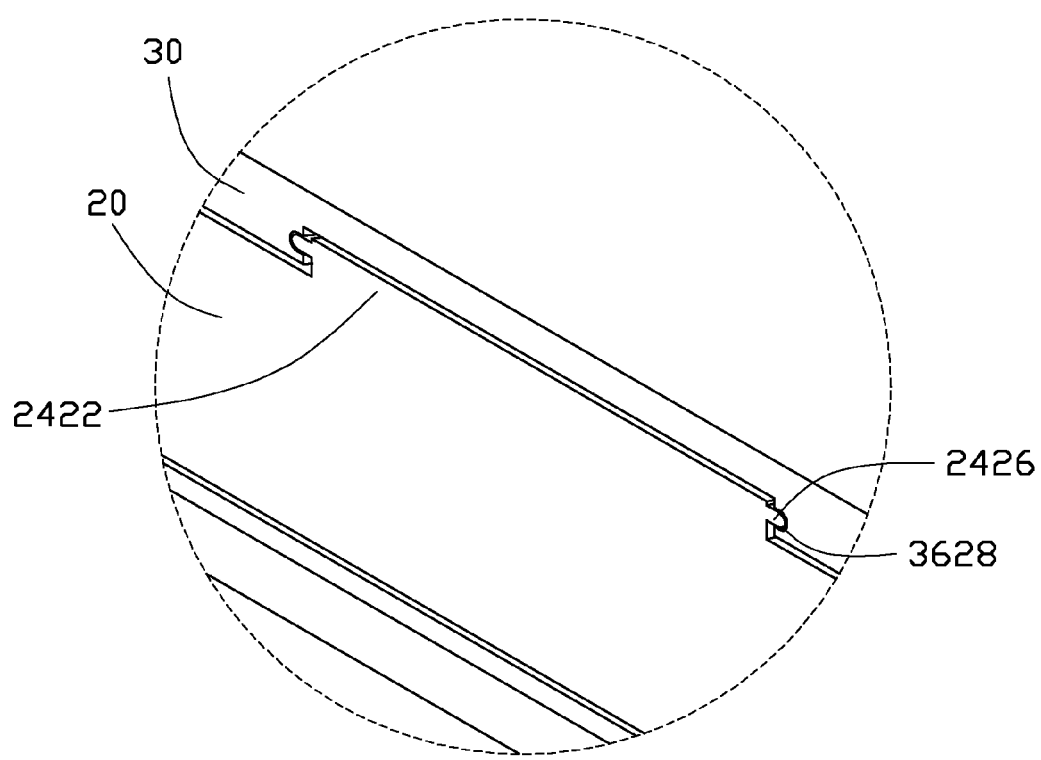
FIG. 7 is a partial enlarged view of the battery cover.

Referring to FIGS. 6-7, the battery cover 30 is rotated to allow the extending portion 382 to slide into the guiding groove 262 of the bar 26. The protuberances 3822 force the projections 2622 to make the bar 26 be deformedly enlarged until the protuberances 3822 pass over the projections 266 and are latched in position by the projections 266. The first latch portion 242 and the second latch portion 244 are respectively slid in the first engaging portion 362 and the second engaging portion 364. The first protrusions 2426 are engaged in the first slot 3628. The second protrusions 2446 are engaged in the second slot 3648. The stopper block 3626, 3646 are latched in the stopper spaces 2428, 2448. Thus, the battery cover 30 is assembled in the housing 20.

When the battery cover 30 is to be opened, the battery cover 30 is rotated counter-clockwise according to the arrow direction of FIG.6. The protuberances 3822 force the bar 26 to deform so that the protuberances 3822 pass over the projections 2622 in the opposite direction from previously described. The battery cover 30 may be rotated to a predetermined position.

As described above, the exemplary embodiment provides a battery cover assembly for portable electronic devices, such as mobile phones. The battery cover of the battery cover assembly can be easily opened. This rotating removal step makes the operation of the device more user-friendly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover assembly for a portable electronic device, the battery cover assembly comprising:
   a housing forming a first latch portion and a second latch portion arranged in a circle; wherein the first, second latch portions each include a first block and a second block integrally formed together, thereby forming a substantially T-shape;
   a battery cover forming a first engaging portion and a second engaging portion engaging with the first latch portion and the second latch portion respectively; and
   a pivot member including a base plate and a circular disk mounted on the base plate, the circular disk coaxial to the circle, the pivot member mounted to the housing, the battery cover rotatably connected to the circular disk;
   wherein the battery cover is rotated around the pivot member relative to the housing until the first engaging portion and the second engaging portion respectively receive the first latch portion and the second latch portion for latching the battery cover to the housing.

2. The battery cover assembly as claimed in claim 1, wherein one of the first blocks includes a first protrusion at two sides thereof, and one of the second blocks includes a second protrusion at two sides thereof.

3. The battery cover assembly as claimed in claim 2, wherein the first and second engaging portion each define a first receiving space communicating with a second receiving space, and the first receiving space and the second receiving space form substantially a T-shape.

4. The battery cover assembly as claimed in claim 3, wherein one of the first receiving spaces define a first slot at two sides thereof, and one of the second first receiving spaces define a second slot at two sides thereof, the first protrusions are engaged in the first slots, the second protrusions are engaged in the second slots.

5. The battery cover assembly as claimed in claim 1, wherein the housing forms an arcuate bar, the bar defines a guiding groove and forms two opposite projections on the guiding groove.

6. The battery cover assembly as claimed in claim 5, wherein the battery cover forms an extending portion engaging in the guiding groove, the extending portion forms a protuberance at one end of each side thereof for engaging with the projections.

7. The battery cover assembly as claimed in claim 1, wherein a ring groove is defined at the circular disk toward the base plate, and the base plate defines a plurality of ribs, the housing defines a plurality of latching slots for receiving the ribs of the pivot member.

8. The battery cover assembly as claimed in claim 7, wherein the base plate includes a semi-circular portion and a rectangular portion tangentially connected each other, and the circular disk is coaxial with the semi-circular portion.

9. A portable electronic device comprising:
   a housing forming a first latch portion, a second latch portion and defining a groove and a plurality of latching slots, the first latch portion and the second latch portion arranged in a circle; wherein the first, second latch portions each include a first block and a second block integrally formed together, thereby forming a substantially T-shape;
   a pivot member received in the groove, the pivot member defining a ring groove and forming a plurality of ribs received in the latching slots; and
   a battery cover forming a plurality of tabs rotatably received in the ring groove, a first engaging portion and a second engaging portion engaging with the first latch portion and the second latch portion.

10. The portable electronic device as claimed in claim 9, wherein the pivot member includes a base plate and a circular disk formed on the base plate, and the base plate is received in the groove, the base plate defines the ribs, the circular disk is coaxial to the circle.

11. The portable electronic device as claimed in claim 10, wherein the base plate includes a semi-circular portion and a rectangular portion tangentially connected each other, and the rotatable disk is coaxial with the semi-circular portion.

12. The battery cover assembly as claimed in claim 1, wherein the housing includes a base body, two sidewalls, a semi-circular wall, and an end wall, a beam divides the base body into a groove for receiving the base plate and a cavity for receiving a battery.

13. The battery cover assembly as claimed in claim 12, wherein the base plate includes a semi-circular portion and a rectangular portion tangentially connected each other, the semi-circular portion defines a cutout, the semi-circular wall forms a latching plate engagable in the cutout.

14. The battery cover assembly as claimed in claim 12, wherein each sidewall forms a support stage extending into the cavity, the two support stages respectively form the first latch portion and the second latch portion.

15. The portable electronic device as claimed in claim 11, wherein the semi-circular portion defines a cutout, the housing includes a base body and a semi-circular wall, a beam divides the base body into the groove for receiving the base plate and a cavity for receiving a battery, the semi-circular wall forms a latching plate engagable in the cutout, and the base body defines the latching slots.

* * * * *